US006587125B1

United States Patent
Paroz

(10) Patent No.: US 6,587,125 B1
(45) Date of Patent: Jul. 1, 2003

(54) REMOTE CONTROL SYSTEM

(75) Inventor: Dani Paroz, Kfar Vradim (IL)

(73) Assignee: Appswing LTD, Misgav (IL)

( * ) Notice: Subject to any disclaimer, the term of this patent is extended or adjusted under 35 U.S.C. 154(b) by 0 days.

(21) Appl. No.: 09/630,655

(22) Filed: Aug. 1, 2000

Related U.S. Application Data

(60) Provisional application No. 60/194,168, filed on Apr. 3, 2000.

(51) Int. Cl.[7] .................................................. G06F 3/00
(52) U.S. Cl. ....................... 345/740; 345/733; 345/738; 345/744; 345/746; 345/748; 709/201; 709/227; 709/228; 709/319
(58) Field of Search ................................. 345/762, 760, 345/744, 733, 740, 748, 738, 746, 747, 765; 709/201, 203, 208, 227, 228, 319, 328

(56) References Cited

U.S. PATENT DOCUMENTS

| 5,801,689 A | * | 9/1998 | Huntsman ................... 345/733 |
| 5,914,713 A | * | 6/1999 | Nario et al. ................. 345/744 |
| 6,078,322 A | * | 6/2000 | Simonoff et al. ........... 345/744 |
| 6,216,237 B1 | * | 4/2001 | Klemm et al. ................ 714/38 |
| 6,286,003 B1 | * | 9/2001 | Nuta ........................... 707/10 |

* cited by examiner

Primary Examiner—Raymond J. Bayerl
Assistant Examiner—Cuong T. Thai
(74) Attorney, Agent, or Firm—Reed Smith LLP

(57) ABSTRACT

Disclosed is a method for remotely controlling a first computing device from at least one of a plurality of second computing devices, the first computing device having a user interface and a data communications connection to the second computing device and the second computing device adapted to present a user interface. The method comprises analyzing the static and dynamic logic of the first computing device's user interface and creating a logically equivalent user interface in a platform-independent format for the second computing device. The equivalent user interface enables control of the first coupling device from the second computing device.

22 Claims, 5 Drawing Sheets

REMOTE CONTROL SYSTEM

This invention relates to the field of remotely controlling a first computing device from at least one of a plurality of second computing devices. This application corresponds to U.S. provisional patent application Ser. No. 60/194,168 filed Apr. 3, 2000.

BACKGROUND OF THE INVENTION

Field of the Invention

A remote control system enables a first (or "local") computing device to be controlled via a second (or "remote") computing device.

U.S. Pat. No. 5,949,412 issued to Huntsman, entitled "Computer Remote Control System", proposed a remote control system where the client is a Web browser. A screen image of the controlled application is transferred as a bitmap image displayable within a Web browser (GIF file).

His solution lacks the following:

- client graphical user interface (GUI) is a bitmap image and not made of logical elements;
- no on-the-fly conversion;
- no continuous update of client screen;
- no customization and adaptation of the client widgets;
- his invention used a click-able image to send coordinates to the server, however, he does not explain how the image is constructed nor does he claim that the image is constructed automatically;
- while mouse input is supported, keyboard input is not, though keyboard capabilities are mentioned in passing;
- the client uses HTML, not DHTML, consequently, there are no event handlers (only coordinate click events);
- no collaboration;
- no support for 3-tier architecture (our FIG. 1).

Other prior art remote control systems had similar limitations and further limitations:

First, they generally involve a bit-to-bit representation of the first computing device's GUI on the second computing device. This is an inefficient method which does not lend itself to customization: the GUI on the second computing device has to be the same as that on the first computing device.

Second, the communications are binary, which is heavier than logical, text based communications. For example, if the first GUI changes to show new text, the image of that text must be sent to the second computing device. Whereas if the communication were logical, simply the text would be passed.

Third, since the second GUI is just a graphic, all its logic must come from the first computing device. For example, if the remote user clicks on a button, that event must be sent to the first computing device which then sends back an image of the button being recessed. Whereas if the second computing device had display level logic, it would know to display the clicking without having to contact the first computing device.

Fourth, binary communications are not "firewall friendly". Generally a firewall must be reconfigured to allow a remote control system to operate across it.

Fifth, since the binary communications format of prior remote control applications is less secure, when a first computing device is on a LAN, it must be on the gateway to the LAN. In other words, the first computing device cannot be a workstation on the LAN because that might compromise security.

Sixth, until now it has not been possible to separate the GUI logic of desktop applications from the program logic as it is with client-server applications.

Seventh, because the previous remote control systems used "bit-to-bit" communications, there were sometimes problems getting the system to work correctly when the second computing device was a different software and/or hardware platform than the first computing device.

The present invention differs substantially from prior solutions in that the user interface (UI) of the first computing device is analysed and a second, logically equivalent, UI is generated and sent to the second computing device. A user can thereby operate the first computing device via the second UI on the second computing device. In a preferred embodiments of the present invention the UI is specifically a GUI (graphical user interface). The logically equivalent GUI is constructed, in these embodiments, of DHTML which is displayed in a browser on the second (remote) computing device.

To illustrate how the logical GUI used in the present invention differs from the image-based systems used in prior remote control systems, consider the example of Microsoft Corporation's Windows (R). There the GUI consists of objects, such as buttons. When the user clicks a button, the button display changes to show itself appearing to be recessed and then return to its original state. At the same time the button might send a "clicked-on" message to the underlying program. The underlying program might then reply by changing the text or color of the button.

In some operating systems the GUI's structure can be detected and analyzed (e.g., via the Windows HWND handle). Based on this analysis, the second, logically equivalent UI mentioned above can be built. The second UI becomes the new interface to the first computing device— In effect, the present invention converts a desktop application into a two tier application (client-server).

The second UI is as platform-independent as possible so as to enable it to be displayed on a wide range of second computing devices. For example, the second GUI can be built with a dynamic markup language such as DHTML, which can be viewed in most Web browsers, irrespective of the platform the browser is running on.

Therefore, one of the major objects of the present invention is to analyze a program's UI and build a functional universal copy by which a remote computing device can control the original program.

Another object of the present invention is to effect this process on-the-fly, i.e., when a user of the second computing device opens a new program on the local computing device for remote control, the present invention automatically analyzes the first GUI, generates the second GUI, and sends it to the second computing device. No user intervention is required.

To summarize some of the major innovations of the present invention: it detects (on the fly) the appearance and logic of the UI of a local program (application or operation system) on a first computing device, transfers control of the local program to the logical UI running on the second computing device, and enables post-processing customization of the logical UI, its interaction with the user, and its interaction with the local program. And these operations can be performed on local programs that were not designed for client-server operation.

Some of the major advantages of the present invention are as follows:

First, a first GUI is converted to a second, logically equivalent GUI— not a bit-to-bit image. This conversion is done on-the-fly: as a layout (window) is displayed in the first GUI, a logically equivalent duplicate GUI is generated and transferred to the second computing device where it is displayed.

Second, less data needs to be transferred since only logic is transferred, not pixel changes. For example, if the local program changes the text on a GUI object, the remote client is sent just an instruction to change the test displayed rather than a completely new image of the object including the new text.

Third, the remote client can display results of user input itself. For example, when a user clicks a button, the DHTML page handles displaying the visual effect without having to be sent an image of the button going in and then another image of the button coming back out.

Fourth, since the remote GUI is separate from the local program, the second GUI can be customized (after the on-the-fly creation) in various respects, including: the appearance/location of GUI objects, the handling of user actions, and/or the handling of events (messages) from the local application.

Fifth, the DHTML is sent to the remote client as test via the HTTP protocol. This is a well known, secure protocol that conforms to security requirements. For example, firewalls normally enable HTTP data communications. Therefore in LAN installations, the first computing device is not restricted for security reasons to a gateway, and instead can be any workstation on the LAN.

Sixth, the remote GUI will display correctly in any second computing device capable of displaying a DHTML web page, regardless of whether that second computing device is a different type of hardware, (e.g., mobile phone, personal digital assistant, etc.) and/or has a different resolution than the first computing device.

Seventh, when a second computing device joins an active remote control session it receives the second GUI in its current state.

Eighth, remote GUIs for multiple local programs can be combined in a single remote GUI.

Ninth, multiple instances of a remote GUI for a given local program can run simultaneously on multiple remote computing devices, enabling active or passive collaboration.

Tenth, the second GUI can be frozen at any time—when unfrozen it will update to display the current state of the local program.

BRIEF DESCRIPTION OF THE PRESENT INVENTION

There is thus provided in accordance with a preferred embodiment of a method for remotely controlling a first computing device from at least one of a plurality of second computing devices, the first computing device having a user interface and a data communications connection to to the second computing device, the second computing device adapted to present a user interface, the method comprising:
　analyzing the static and dynamic logic of the first computing device's user interface;
　creating an equivalent user interface in a platform-independent format, wherein said static and dynamic logic is substantially replicated;
　sending said equivalent user interface to the second computing device where it is implemented;
　handling user input to said equivalent user interface, including sending output to the first computing device;
　handling output originating in the first computing device, said handling including sending output to said equivalent user interface on the second computing device;
thereby enabling control of the first computing device from the second computing device.

Furthermore, in accordance with another preferred embodiment there is provided:

A method for remotely controlling a first computing device from at least one of a plurality of second computing devices, the first computing device having a graphical user interface and a data communications connection via a Web server to the second computing device, the second computing device adapted to display a Web browser, the method comprising:
　analyzing the static and dynamic logic of the first computing device's graphical user interface and creating an equivalent graphical user interface in a Web browser supported format, wherein said static and dynamic logic is substantially replicated;
　sending said equivalent graphical user interface to the second computing device where it is displayed in the Web browser;
　detecting changes in the status of the first computing device and sending those changes to said equivalent graphical user interface;
　receiving control input from said equivalent graphical user interface and executing it on the first computing device;
thereby enabling control of the first computing device from the second computing device.

Furthermore, in accordance with another preferred embodiment of the present invention, said equivalent graphical user interface is created in real time.

Furthermore, in accordance with another preferred embodiment of the present invention, said equivalent graphical user interface is created automatically.

Furthermore, in accordance with another preferred embodiment of the present invention, said equivalent graphical user interface's visual characteristics, its input handlers, and its output handlers is customizable.

Furthermore, in accordance with another preferred embodiment of the present invention, the most recent state of the first computing device is continuously sent to said equivalent graphical user interface in response to polling from said equivalent graphical user interface.

Furthermore, in accordance with another preferred embodiment of the present invention, the most recent state of the first computing device is sent to any additional computing device that joins the remote control session.

Furthermore, in accordance with another preferred embodiment of the present invention, the state of said equivalent graphical user interface can be frozen at any time and when unfrozen is immediately update to the current state of the first computing device.

Furthermore, in accordance with another preferred embodiment of the present invention, a software component on the first computing device performs said analysis of the first computing device's graphical user interface.

Furthermore, in accordance with another preferred embodiment of the present invention, a software component on the first computing device monitors output events from the first computing device and based on said dynamic and static analysis, determines what action to take.

Furthermore, in accordance with another preferred embodiment of the present invention, a software component on the first computing device monitors input events from the second computing device and handles those events based on said dynamic and static analysis.

Furthermore, in accordance with another preferred embodiment of the present invention, a software component on said Web server mediates communication between the first computing device and the said equivalent graphical user interface.

Furthermore, in accordance with another preferred embodiment of the present invention, said Web server is on the first computing device.

Furthermore, in accordance with another preferred embodiment of the present invention, said Web server is on a separate hardware device and has data communication connections with the first computing device and with the second computing device.

Furthermore, in accordance with another preferred embodiment of the present invention, said data communications connection between said Web server and the first computing device is a LAN.

Furthermore, in accordance with another preferred embodiment of the present invention, there if provided:

A system for remotely controlling a first computing device from at least one of a plurality of second computing devices, the first computing device having a graphical user interface and a data communications connection via a Web server to the second computing device, the second computing device adapted to display a Web browser, the system comprising:

- a window analysis system that analyzes the static and dynamic logic of the first computing device's graphical user interface and creates an equivalent graphical user interface in a Web browser supported format, wherein said static and dynamic logic is substantially replicated;
- a mediation system that:
  sends said equivalent graphical user interface to the second computing device where it is displayed in the Web browser, and sends updated information about the state of the first computing device to the equivalent graphical user interface, and receives control input from the equivalent graphical user interface;
- a visual status monitoring system that detects changes in the status of the first computing device and sends those changes to said mediation system for transfer to the second computing device;
- a command executing system that receives said control input from said mediation system and executes it on the first computing device;

thereby enabling control of the first computing device from the second computing device.

Furthermore, in accordance with another preferred embodiment of the present invention, said equivalent graphical user interface is created in real time.

Furthermore, in accordance with another preferred embodiment of the present invention, said equivalent graphical user interface's visual characteristics, its input handlers, and its output handlers can be customized.

Furthermore, in accordance with another preferred embodiment of the present invention, the most recent state of the first computing device is continuously sent to said equivalent graphical user interface in response to polling from said equivalent graphical user interface.

Furthermore, in accordance with another preferred embodiment of the present invention, the state of said equivalent graphical user interface can be frozen at any time and when unfrozen is immediately updated to the current state of the first computing device.

Furthermore, in accordance with another preferred embodiment of the present invention, said mediation system sends an updated equivalent graphical user interface to any additional computing device that joins the remote control session.

Furthermore, in accordance with another preferred embodiment of the present invention, said Web server is on the first computing device.

Furthermore, in accordance with another preferred embodiment of the present invention, said Web server is on a separate hardware device and has data communication connections with the first computing device and with the second computing device.

Furthermore, in accordance with another preferred embodiment of the present invention, said data communications connection between said Web server and the first computing device is a LAN.

DETAILED DESCRIPTION

| | Glossary |
|---|---|
| (G)UI | (Graphical) User Interface |
| Client machine | Standard Internet browser capable apparatus |
| Collaboration | Operation mode where many remote clients are working on the same instance of the same application. |
| DCE-RPC | Data Communications Exchange - Remote Procedure Call |
| DCOM | Dynamic Component Object Model (Microsoft Technology) |
| DHTML | Dynamic Hypertext Markup Language |
| HTTP | Hypertext Transfer Protocol |
| HWND | Window handle in Windows environment |
| IPC | Internal Procedure Call |
| ISDN | Integrated Services Digital Network |
| Layout | Set of widgets in predetermined geographic configuration onscreen. An example in Microsoft Corporation's Windows is an application window or dialog box. A layout is represented on a Web browser as an DHTML page. |
| WAP | Wireless Application Protocol |
| Widget | A graphical onscreen object. A widget may serve as a means to input commands or data to a computer program and/or to display data from a computer program. |
| WML | Wireless Markup Language |
| XML | eXtended Markup Language |

The present invention provides a method and a system for remote control of a first (or "local") computing device by at least one of a plurality of second (or "remote") computing devices.

This invention analyzes the first computing device's user interface on-the-fly, creates a logically equivalent second user interface in a universal (i.e., platform-independent) format, and sends it to the second computing device.

Figure 1:
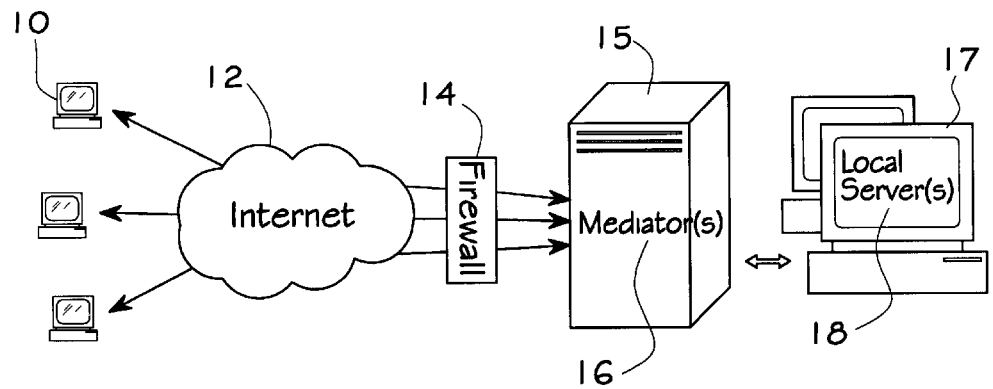
FIG. 1 is a high level architectural view in accordance with the principles of the present invention.
Figure 2:
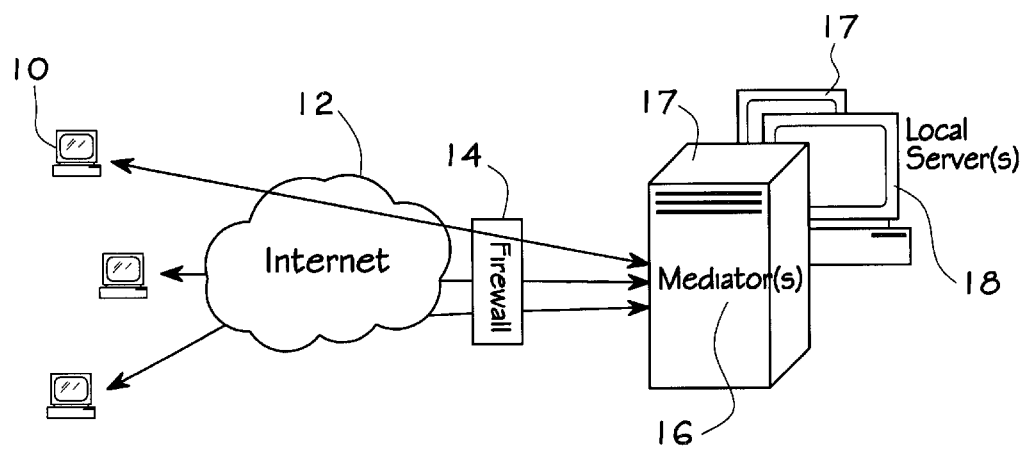
FIG. 2 is a high level architectural view in accordance with the principles of the present invention.

The second user interface running on the second computing device ("remote interface") communicates with the first computing device ("local program") via two software intermediaries, which are the primary components of the present invention. These intermediaries are shown in FIG. 1 and FIG. 2 They are the local server 18 software program, and mediator 16 software program.

The local server 18 comprises three active software components: window analyzer 34, command executor 32, and visual status monitor 30. The local server 18 stores data in a configuration database 36.

The local server 18 does the following: it monitors the UI output from the local program and sends appropriate output to the remote computing device 10 via the mediator 16; it sends commands received from the second computing device 10 via the mediator 16 to the local program; it analyzes the layouts (windows) displayed by the local program and then creates and maintains the logically equivalent GUI on the second computing device 10.

The other major component of the present invention, the mediator software program 16, serves as a mediator between the local server 18 and the second computing device 10. The mediator receives input from both entities and sends output to both entities. In addition, it is the mediator that makes it possible to carry out collaborative sessions where multiple second computing devices 10 share a single local program.

The current invention is described here in two preferred embodiments wherein the local program runs in a Microsoft Windows GUI environment on a first computing device connected via the Internet to at least one of a plurality of second computing devices and wherein the second user interface is implemented as a DHTML web page displayed in a Web browser. However, it will be apparent to one skilled in the art that the present invention can be embodied alternatively using other types of user interface, operating system, communications connections, and/or remote interface implementation. The second computing device 10 in these embodiments may be any device with standard Internet browsing capabilities, such as a desktop PC handheld device, personal digital assistant, smart phone, network computer, etc.

In one preferred embodiment, shown in FIG. 1, second computing devices 10 are connected via the Internet 12 and firewall 14 to a mediator software program 16 residing on a Web server 15 connected to a LAN and communicate via HTTP (or other Internet secure protocol). The mediator program 16 communicates with a local server software program 18 residing on a first computing device 17 on the LAN via an intranet protocol (e.g., DCOM or DCE-RPC).

Another preferred embodiment is shown in FIG. 2. Second computing devices 10 are connected via the Internet 12 and firewall 14 to a mediator 16 software program residing on a Web server 15 and communicate via HTTP (or other Internet secure protocol). In this embodiment the mediator 16 and the local server 18 reside on the same first computing device 17 (which is also a Web server 15), and communicate via an inter-process protocol (e.g., COM or IPC).

The description which follows applies for both of the preferred embodiments of the present invention. The description shows how the mediator 16 and the local server 18 work together to enable a second computing device 10 to control a local program (i.e., application, operating system component, etc.) running on the same first computing device 17 as the local server 18. The relationship between the second computing device 10 and the local program it controls can be one to one, one to many, or many to one. In other words, one or more second computing devices can control one or more local programs running on one or more first computing devices.

The interface between the remote interface and the local program can be modified with post-processing. For example, new objects can be added to the remote interface, the behaviors of remote interface objects can be changed, etc.

The remote control system is activated when a user of a second computing device 10 contacts the mediator 16. In these embodiments this is done by entering a URL in a browser on the second computing device 10 (can optionally be password protected. The mediator 16 replies with a list of local servers 18 and the user can select one or more programs on one or more local servers.

As will described later, the mediator sends the second computing device 10 a set of DHTML or WML pages, which run on the second computing device's 10 Web browser. These pages form the second user interface by which a user can control the first computing device 17.

Figure 3:
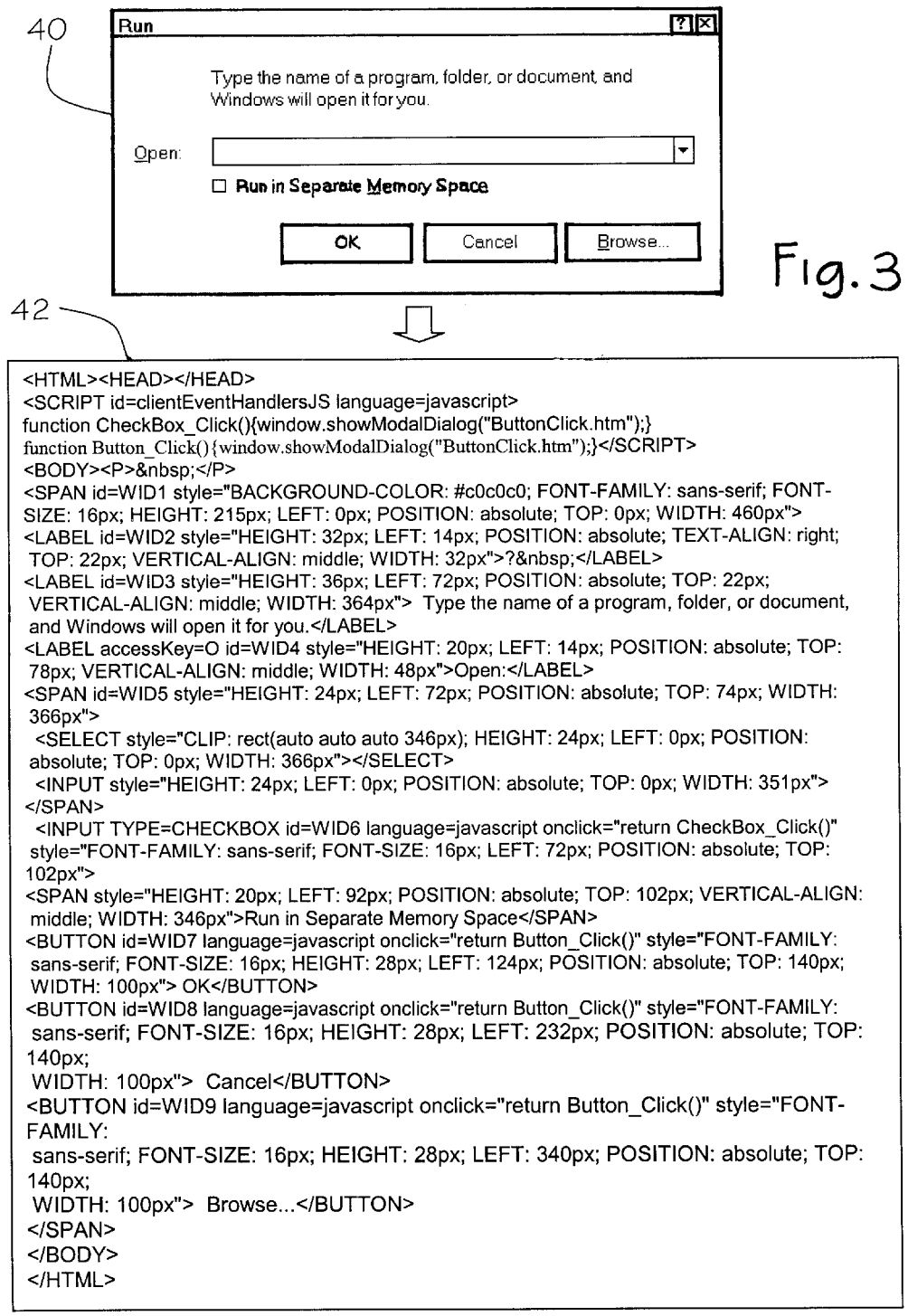
FIG. 3 is a sample dialog box layout and the code generated for that layout in accordance with the principles of the present invention.

FIG. 3 shows a sample layout 40 (dialog box) for the second user interface and the layout's DHTML code. The term layout is used here to refer to a primary GUI entity, for example an application window or dialog box. On each page part of the script constantly polls the mediator 16 to query for changes that affect the visible state of any widget in the layout (or potentially affect the visible state, e.g., when a menu item is added and will be visible the next time the menu is opened).

When a user of the second computing device 10 performs an action (mouse or keyboard input) on a widget, the widget has associated event handling code. If the event handling code calls for it, an event or events are passed to the mediator 16, from which it/they are passed to the local server for execution.

Multiple second computing devices 10 running on different machines can connect to the same mediator 16 to view the same application session simultaneously. Control can be allotted to one or more of these concurrent users. In an alternative configuration, each client has its own mediator 16 and runs its own session.

A second computing device 10 may freeze its input data stream (independent of other clients collaborating on the same application). When the client unfreezes, it is updated immediately with the current sate of the application (which is always maintained in the mediator 10).

Figure 4:
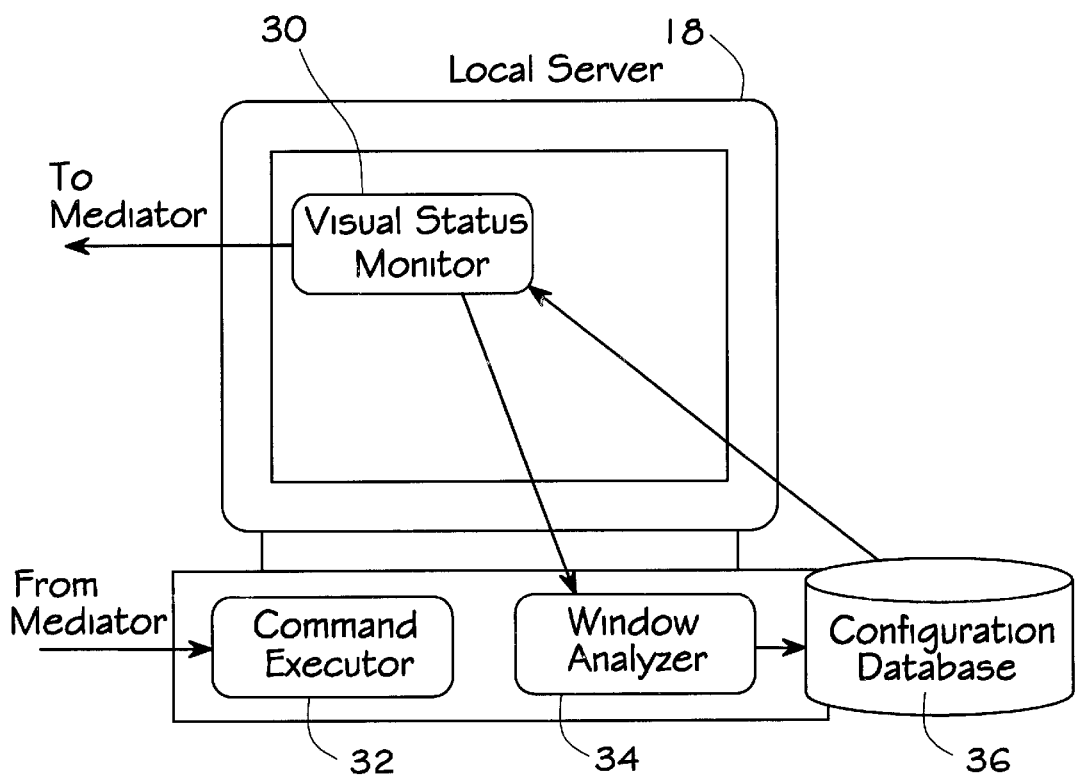
FIG. 4 is an architectural view of the primary components of the local server component in accordance with the principles of the present invention.

FIG. 4 shows the primary components of the local server 18, which runs on the first computing device. When a program is first selected by a remote user, the local server 18 activates the program (if it is not already active) and the window analyzer 34 generates a DHTML page for each layout.

The DHTML page can be customized for properties such as window size, font, language, color, refresh rate, target device, and communication protocol (e.g. HTTP, HTTP, WAP).

The window analyzer 34 can generate the DHTML pages according to parameters such as target second computing device 10 (e.g., Palm-Pilot, Cell-Phone), communication type (e.g., modem ISDN), or target browser (e.g., Microsoft Corporation's Explorer, Netscape Corporation's Navigator).

The visual status monitor 30 monitors GUI events (e.g., Windows messages) generated by the local program and updates the widgets (DHTML page) running on the second computing device 10.

The command executor 32 gets messages from the widgets on the second computing device 10 and translates them into commands (or a series of commands) executed on the local program.

FIG. 3 shows a sample layout 40 (dialog box) and the layout's DHTML code 42 generated by the window analyzer. When the DHTML is displayed in the browser of the second computing device 10, it substantially replicates the GUI of the local program.

The window analyzer 34 takes the GUI object identifier (e.g., HWND in the Windows environment) as input and analyzes the construction of the GUI object and its child GUI objects. The analysis is logical, i.e., the window analyzer 34 identifies the UI object type (button, list, etc.) and creates a database 36 record consisting of three parts: the object's static attributes (e.g., size, visibility state, etc.), the object's interface to the local program, and the object's interface to the second computing device 10.

The DHTML code that the window analyzer 34 creates for a widget consists of the static attributes to display, handlers for events received from the local programs, and handlers for events occurring on the second computing device 10 (e.g., keyboard, mouse click, etc.).

When the DHTML page is running in the browser of the second computing device 10 and an event occurs (e.g., mouse click on a widget), then, depending on the widget and its handler for that event, one of the following occurs: the event generates output to the command executor 32, the event affects the widget in the browser, both, or nothing.

The window analyzer 34 also records in the database 36 the local server input event handlers for output generated by the DHTML widget. The input event handlers are used later by the command executor 32 (described below) to generate messages to the local program or other commands (e.g., direct database access).

The visual status monitor 30 monitors GUI events (e.g., Windows messages) generated by the local program. When a GUI event occurs, the visual status monitor 30 looks it up in the configuration database 36 to determine whether to generate a message to the mediator 16 for the second computing device 10.

Figure 5:
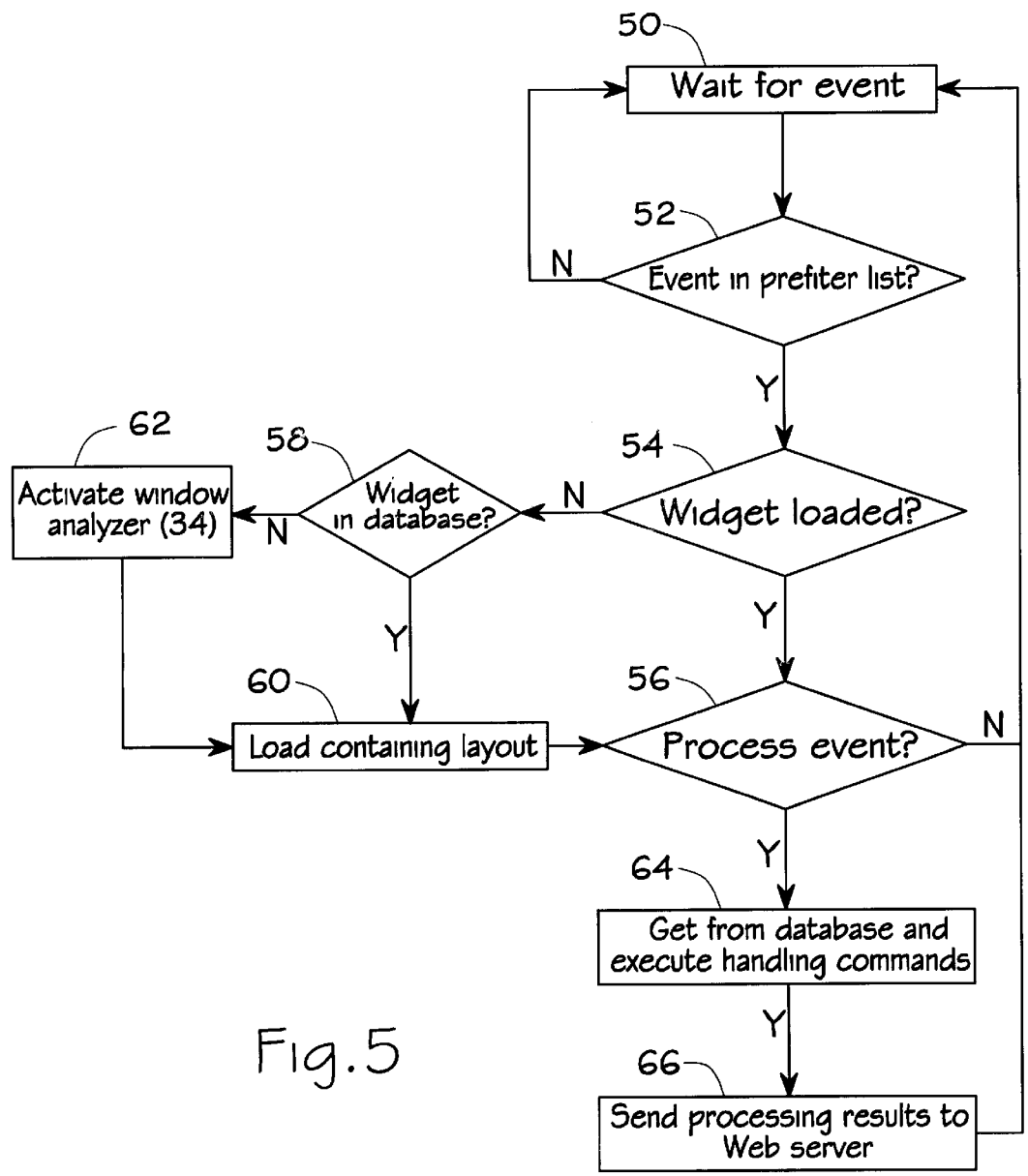
FIG. 5 is a flow chart of the process for handling events received from the second computing device in accordance with the principles of the present invention.

FIG. 5 is a flow digram of the operation of the visual status monitor 30. The following explanation is numbered according to the steps of the diagram.

Step 50: The visual status monitor 30 monitors GUI events generated by the local program.

Step 52: When the local program generates an event, the visual status monitor 30 checks it against a predefined list of relevant event types, if the event is not in the list, it is ignored.

Step 54: If the GUI event is relevant, the visual status monitor 30 attempts to match the originating GUI widget (object) to a list of active local event handlers (meaning that at least one event has already been received from that widget).

Step 58: If no match was found in step 54, the visual status monitor 30 searches records of local program widget definitions created by the window analyzer 34 in the database 36. If a match is found, the database layout for the widget is loaded (step 60).

Step 62: If no match was found in step 58, the visual status monitor 30 activates the window analyzer 34 to generate a new layout.

Step 60: The layout is loaded.

Step 56: The local event is sent to the widget in the layout to determine whether to process it.

Step 64: If the widget determines that the event should be processed, then the visual status monitor 30 looks up the event in the configuration database 36 to determine what action to perform and performs this action.

Step 66: The action's results are transmitted to the mediator 16.

Examples of actions includes: get embedded text/image, get enable/check state, get new position/size etc.

The command executor 32 receives messages from the second computing device 10 (typically resulting from a user interaction with a DHTML widget) and translates them into commands (or series of commands) executed on the local program.

The role of the command executor 32 therefore, is to accept events from the second computing device 10, identify the local object associated with the event, and pass the event to that local object. The local object performs the actions required.

The system uses default mappings of remote actions to local commands (as detected by the windows analyzer 34 when it analyzed the UI). By default the action is to send the equivalent message to the operating system (click is a click etc.) The default action can be changed by post-processing.

Figure 6:
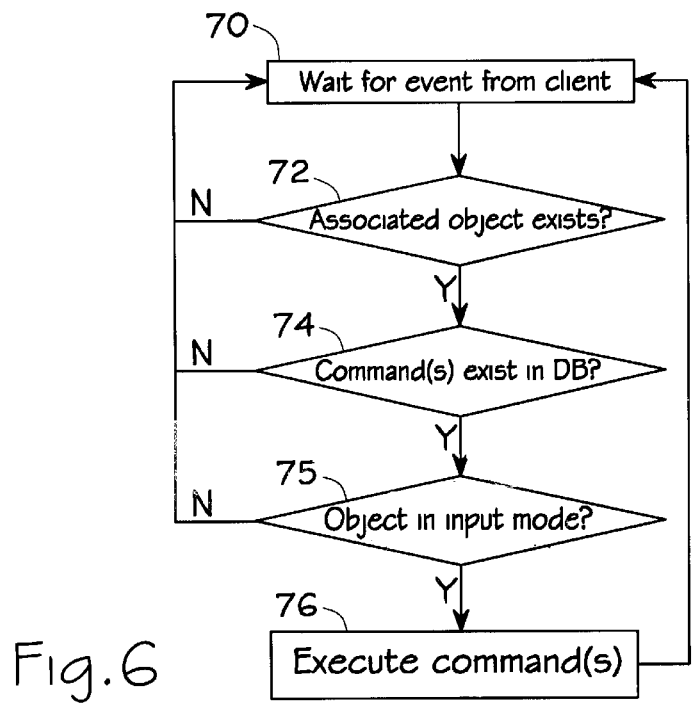
FIG. 6 is a flow chart of the process for handling events occurring on the first computing device in accordance with the principles of the present invention.

FIG. 6 is a flow diagram of the operation of the command executor 32.

Step 70: Command executor 32 waits for event from second computing device 10.

Step 72: Is there a local object (widget) associated with the event?

Step 74: Does the local object have a command associated with the event?

Step 75: Is the object in a mode where it can receive input?

Step 76: Execute the command.

Figure 7:
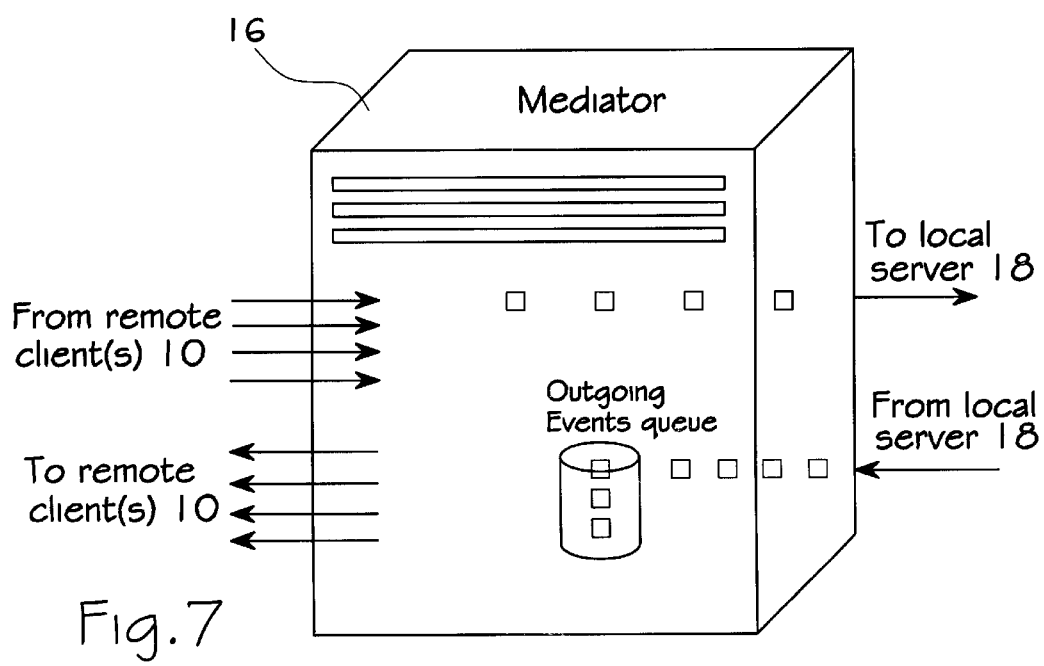
FIG. 7 is an architectural view of the mediating software component in accordance with the principles of the present invention.

The mediator 16 is a computer program that is integrated with a Web server 15, either as part of the Web server or as a plug-in. The mediator 16 is shown in FIG. 7.

The mediator 16's role is to serve as the mediation device between the local server 18 and the second computing device(s) 10.

A mediator 16 mediates between one or more local server(s) 18 and one or more second computing devices 10. Many mediators may execute on the same physical machine.

The mediator 16 accepts events from the local server 18 and buffers them according to their creation time. The second computing device 10 polls the mediator 16 for changes, and the mediator 16 replies with a list of events (in XML format), which the DHTML processes. Only events required to update the DHTML to the local program's current state are sent.

The mediator 16 consolidates overlapping events and saves the minimal set of events required to reflect the current application's state for a new computing device 10. If a new computing device joins an ongoing remote session (e.g., buy opening the same URL), the DHTML page that it receives from the mediator 16 reflects the current state of the remote session.

Working in the opposite direction the mediator 16 accepts events from the second computing device 10 and transmits them to the local server 18 where the command executor 32 identifies the object definitions associated with those events and executes the associated commands (e.g., sends messages to the local program) as was described above.

The mediator 16 may be configured to allow only one client to control an application while the other participants are in read-only mode or to allow several clients shared control rights.

Once a layout has been generated with the window analyzer 36, its properties (in the local database and/or in the DHTML page that is sent to the client) may be post processed, i.e., customized.

The following are some examples of widget properties that can be manipulated: change location within the layout, change size, hide, change static text to different font/size/color/language, define special imaging hardware (such as a frame grabber or cam) that supplies images to the local program UI, define the sampling rate for transmitting an image in the local program UI to the second computing device, modify mapping of events (e.g., draw, move, access a database).

It should be clear that the description of the embodiments and attached Figures set forth in this specification serves only for a better understanding of the invention, without limiting its scope as covered by the following claims.

It should also be clear that a person skilled in the art, after reading the present specification could make adjustments or amendments to the attached Figures and above described embodiments that would still be covered by the following claims.

What is claimed is:

1. A method for remotely controlling an application executing on a first computing device from at least one of a plurality of second computing devices, the application having a user interface and the first computing device having a data communications connection to the second computing device, the second computing device capable of presenting a user interface, the method comprising;

providing a mediating program, residing either on the first computing device or on a third computing device communicating with both the remote computing device and the second computing device, is used to send the equivalent user interface in format supported by the second computing device to the second computing device where it is displayed;

analyzing the user interface of the application executing on the first computing device to determine the static and dynamic logic of the interface;

creating an equivalent user interface in a platform-independent format, wherein said static and dynamic logic is substantially replicated;

sending the equivalent user interface to the second computing device where it is executed;

handling user input to the equivalent user interface, including sending output to the first computing device to be input in the application;

handling output originating from the application in the first computing device, the handling including sending output to the equivalent user interface on the second computing device;

thereby enabling control of the application executed in the first computing device from the second computing device.

2. The method of claim 1, wherein the user interface is a graphic user interface, and the equivalent user interface is a graphic equivalent user interface.

3. The method of claim 1, wherein the equivalent graphical user interface is sent in a Web browser supported format to the second computing device where it is displayed in a Web browser.

4. The method of claim 1, wherein creating said equivalent graphical user interface is achieved automatically.

5. The method of claim 1, wherein the equivalent user interface is customized to include characteristics that are different from characteristics of the user interface of the application.

6. The method of claim 5, wherein the customized characteristic is the window size, font, language, color, refresh rate, target device, input handlers, output handlers or communication protocols.

7. The method of claim 1, wherein a current state of the application executing on the first computing device is continuously polled by the second computing device to identify changes in the user interface of the application first computing device and upon identifying changes update the equivalent user interface.

8. The method of claim 1, wherein a current state of the first computing device is communicated to any additional computing device that joins in a remote control session.

9. The method of claim 1, wherein a software component on the first computing device performs the analysis of the user interface of the application executing on the first computing device.

10. The method of claim 1, wherein a software component on the first computing device monitors output events from the first computing device and, based on the dynamic and static analysis of the user interface, determines what action to take.

11. The method of claim 1, wherein a software component on the first computing device monitors input events from the second computing device and handles those events based on the dynamic and static analysis of the user interface.

12. A method for remotely controlling an application executing on a first computing device from at least one of a plurality of second computing devices, the application having a user interface and the first computing device having a data communications connection to the second computing device, the second computing device capable of presenting user interface, the method comprising:

analyzing the user interface of the application executing on the first computing device to determine the static and dynamic logic of the interface;

creating an equivalent user interface in a platform-independent format; wherein said static and dynamic logic is substantially replicated, wherein a state of the equivalent graphical user interface can be frozen at any time and when unfrozen is immediately updated to the current state of the first computing device;

sending the equivalent user interface to the second computing device where it is executed;

handling user input to the equivalent user interface, including sending output to the first computing device to be input in the application;

handling output originating from the application in the first computing device, the handling including sending output to the equivalent user interface on the second computing device;

thereby enabling control of the application executed on the first computing device from the second computing device.

13. The method of claim 12, wherein the user interface is a graphic user interface, and the equivalent user interface is a graphic equivalent user interface.

14. The method of claim 12, wherein the equivalent graphical user interface is sent in a Web browser supported format to the second computing device where it is displayed in a Web browser.

15. The method of claim 12, wherein creating said equivalent graphical user interface is achieved automatically.

16. The method of claim 12, wherein the equivalent user interface is customized to include characteristics that are different form characteristics of the user interface of the application.

17. The method of claim 16, wherein the customized characteristic is the window size, font, language, color, refresh rate, target device, input handlers, output handlers or communication protocols.

18. The method of claim 12, wherein a current state of the application executing on the first computing device is continuously polled by the second computing device to identify changes in the user interface of the application first computing device and upon identifying changes update the equivalent user interface.

19. The method of claim 12, wherein a current state of the first computing device is communicated to any additional computing device that joins in a remote control session.

20. The method of claim 12, wherein a software component on the first computing device performs the analysis of the user interface of the application executing on the first computing device.

21. The method of claim 12, wherein a software component on the first computing device monitors output events from the first computing device and, based on the dynamic and static analysis of the user interface, determines what action to take.

22. The method of claim 12, wherein a software component on the first computing device monitors input events from the second computing device and handles those events based on the dynamic and static analysis of the user interface.

* * * * *